United States Patent
Seemeyer et al.

(10) Patent No.: US 11,603,477 B2
(45) Date of Patent: Mar. 14, 2023

(54) DRY FILM LUBRICANTS CONTAINING GRAPHENE

(71) Applicant: Kübler Lubrication München SE & Co. KG, Munich (DE)

(72) Inventors: Stefan Seemeyer, Munich (DE); Elena Von Hörsten, Munich (DE); Armin Pfreintner, Munich (DE); Philipp Staub, Munich (DE)

(73) Assignee: Klüber Lubrication München SE & Co. KG, Munich (DE)

( * ) Notice: Subject to any disclaimer, the term of this patent is extended or adjusted under 35 U.S.C. 154(b) by 855 days.

(21) Appl. No.: 16/492,782

(22) PCT Filed: Mar. 12, 2018

(86) PCT No.: PCT/EP2018/000096
§ 371 (c)(1),
(2) Date: Sep. 10, 2019

(87) PCT Pub. No.: WO2018/171931
PCT Pub. Date: Sep. 27, 2018

(65) Prior Publication Data
US 2020/0071547 A1    Mar. 5, 2020

(30) Foreign Application Priority Data

Mar. 22, 2017  (DE) ............... 10 2017 002 792.7
Jan. 25, 2018  (DE) ............... 10 2018 008 610.8

(51) Int. Cl.
| | | |
|---|---|---|
| *C09D 7/61* | (2018.01) | |
| *C09D 7/65* | (2018.01) | |
| *C09D 5/00* | (2006.01) | |
| *C10M 107/38* | (2006.01) | |
| *C08K 3/04* | (2006.01) | |
| *C09D 163/04* | (2006.01) | |
| *C09D 179/08* | (2006.01) | |
| *C10N 50/08* | (2006.01) | |

(52) U.S. Cl.
CPC ............... *C09D 7/61* (2018.01); *C08K 3/042* (2017.05); *C09D 7/65* (2018.01); *C09D 163/04* (2013.01); *C09D 179/08* (2013.01); *C10M 107/38* (2013.01); *C08K 2201/005* (2013.01); *C08K 2201/006* (2013.01); *C10M 2213/0623* (2013.01); *C10N 2050/08* (2013.01)

(58) Field of Classification Search
None
See application file for complete search history.

(56) References Cited

U.S. PATENT DOCUMENTS

2017/0204245 A1* 7/2017 Laing .................... C08K 3/042

FOREIGN PATENT DOCUMENTS

| CN | 106090001 A | 11/2016 |
|---|---|---|
| DE | 10 2012 215 666 A1 | 3/2014 |
| GB | 2528306 A | 1/2016 |
| KR | 20160034625 A | 3/2016 |

OTHER PUBLICATIONS

International Search Report corresponding to international application No. PCT/EP2018/000096, dated May 17, 2018 (13 pages).

* cited by examiner

*Primary Examiner* — Sheeba Ahmed
(74) *Attorney, Agent, or Firm* — Maginot, Moore & Beck LLP

(57) ABSTRACT

Dry film lubricants containing graphene improve the wear resistance and the frictional behavior of the lubricant.

18 Claims, 2 Drawing Sheets

DRY FILM LUBRICANTS CONTAINING GRAPHENE

This application is a 35 U.S.C 371 National Stage application of PCT/EP2018/000096, filed Mar. 12, 2018 and claiming priority to German Application Nos. DE 10 2017 002 792.7, filed on Mar. 22, 2017, DE 10 2018 000 610.8, filed on Jan. 25, 2018. The entire contents of the above-mentioned patent applications are incorporated herein by reference as part of the disclosure of this U.S. application.

BACKGROUND

The present invention relates to graphene-containing dry film lubricants. The use of graphene improves the wear resistance and the frictional behavior of the dry film lubricant.

Surface coating systems are referred to as dry film lubricants if they comprise solid lubricants or lubrication-active substances. The use of polyamideimide as a binder in dry film lubricants is known. Also known is the addition to these dry film lubricants of a solvent, e.g., water or an organic solvent. Moreover, graphene in various resin matrices is used. Graphene is a modification of carbon that has a two-dimensional structure in which each carbon atom is surrounded by an angle of 120° by three further carbon atoms, thus forming a honeycomb-like pattern. In comparison with the three-dimensional graphite, graphene has a very high tensile strength. The purpose of using the graphene is to lower the friction in the dry film lubricant.

It is therefore known practice, being known from the dissertation by B. Schlüter (Functionalized graphenes for tribological applications, dissertation, Freiburg 2014) to use graphene in the form of a thermally reduced graphite oxide (TRGO) as a tribological filler or solid lubricant. For this purpose, TRGO was introduced inter alia into an epoxy matrix, and a reduction in the coefficient of friction was observed.

US 2014/0023450 A1 thus describes a wear prevention coating for wear surfaces in compressors that comprises at least one precursor component, which is used in the form of a powder, and consists of a pulverulent thermoplastic polymer, e.g., polyetheretherketone (PEEK), a first lubricant, e.g., molybdenum sulfide, and a second lubricant, e.g., polytetrafluoroethylene (PTFE), and which is heated prior to use in order to ensure a uniform coating of the surfaces to be coated. Before being coated, the surface is treated with a primer, for which purpose, for example, polyamideimide is used. The first and/or second lubricant used includes, among others, graphene. The graphene is therefore present in the thermoplastic layer.

EP 2 794 769 B2 relates to a composition for producing a tribological composite material, comprising at least one plateletlike solid-state lubricant, at least one type of inorganic plateletlike pigment particles, at least one surface-active compound having at least one hydrophilic and at least one hydrophobic group, and also a curable binder system consisting of an organic polymer or oligomer. Solid-state lubricants used include graphene; another, additional organic solid lubricant that can be used is polytetrafluoroethylene (PTFE). The binder is selected from epoxies and, among others, polyamideimide.

DE 10 2012 215 666 A1 relates to functional parts, especially bearing parts, seals or O-rings, which are provided with a friction-reducing coating that comprises a dry film lubricant, this dry film lubricant comprising graphene.

WO 2016/008770 A1 describes the use of silanes for improving the stability of the polyimide/amide matrix and for likewise improving the adhesion of the resin material on the substrate. The silanes are in this case used as promoters of adhesion between surface and coating. From EP 1 469 050 B1, furthermore, it is known that the use of silanes does not lead to an increase in the wear resistance of the surfaces. The silanes are therefore used as promoters of adhesion of coating to substrate.

A disadvantage of the known dry film lubricants which among other ingredients include graphene, however, is that the use of graphene alone does not lead to the desired improved properties of the dry film lubricants.

A further disadvantage of dry film lubricants in which only graphene is used in a binder matrix is a coefficient of friction that is too high, and also a strong tendency toward stick slip. These disadvantages are also documented in the aforementioned dissertation by B. Schlüter. A graph depicts this disadvantage: in a tribological test, while the coefficient of friction $\mu$ is lowered to around 0.25, there are also sharp deflections visible in an uneven curve; this is a sign of stick slip. The $\mu$=0.25 lowering of the coefficient of friction is very poor in comparison with standard PTFE dry film lubricants, for which values of around $\mu$=0.1 or better are achieved.

This means that a lowering in the coefficient of friction cannot be achieved through the use of graphene alone.

Since in the case of new applications there must be ever more wear-resistant layers, therefore, it is the objective of the present invention to provide a dry film lubricant with which the wear resistance and the frictional behavior of the dry film lubricant are improved. This objective is achieved through the provision of a dry film lubricant wherein the graphene is combined with solid lubricants and these components are introduced into a binder matrix.

Graphene, a monolayer of graphite, was made universally available physically as well in 2004 to research through its isolation via the Scotch tape method. As a monolayer, however, it is stable only when deposited on a surface via a bottom-up process. In powder form, only multilayer graphenes are obtainable, which differ somewhat in their physical properties from the monolayer graphene. Graphene material used for the dry film lubricants in the present patent application comprises commercially available graphene platelets.

In the intervening period, a host of production methods have been developed for these materials. Matching the number of different synthesis pathways is the selection of different materials, differing for example in their dimensions, in their morphology, and in their carbon content.

There is a fundamental distinction between two synthesis pathways. Starting in each case from graphite (top-down process), this graphite can ultimately be singularized, either via an oxidation step or simply by application of high shearing forces, to form platelets of a few layers of graphene (typically <10 nm).

Via the oxidation of graphite to graphite oxide (Hummers method) and subsequent thermal or chemical reduction of the graphite oxide, including singularization, "functionalized graphene" is obtained, with a remnant of oxygen groups (e.g., hydroxyl groups, carboxyl groups). Without an oxidation step, a possible preparation process, for example, is the dispersal of graphite in solvent by means of surfactants and the subsequent application of a high shearing load (e.g., ultrasound or in a high-shear mixer). More recently there are also methods for obtaining graphenes on a larger scale, via a precursor (e.g., acetylene) and subsequent ignition of the precursor-oxygen mixture.

SUMMARY

The dry film lubricant of the invention comprises:
(A) 12 to 32 wt % of binder,
(B) 0.5 to 5 wt % of co-binder,
(C) 4 to 10 wt % of solid lubricant,
(D) 0.5 to 10 wt % of graphene,
(E) 0.1 to 2.0 wt % of additives, and
is then made up to 100 wt % with solvent.

This composition corresponds to a dry layer composition after curing of:
(A) 70.2 to 54.2 wt % of binder,
(B) 2.9 to 8.5 wt % of co-binder,
(C) 23.4 to 16.9 wt % of solid lubricant,
(D) 2.9 to 16.9 wt % of graphene, and
(E) 0.6 to 3.4 wt % of additives.

The binder is a polymer having a molar mass (Mw) of at least 5 000 g/mol to 100 000 g/mol. The binders are selected from the group consisting of polyamideimide (PAI), polyimide (PI), polyetheretherketone (PEEK), polyetherketone (PEK), polyethersulfone (PES), and/or silicone resins or mixtures thereof.

A preferred binder used is polyamideimide (PAI) having a preferred molar mass (Mw) of 10 000 to 30 000 g/mol. Also having proven suitable is PAI with a higher molar mass, which is sold under the brand name Torlon from Solvay. Here the molar mass is unknown.

The co-binder is a molecular or oligomer compound having a molar mass (Mw) of <1 000 g/mol. The co-binder contributes to the wear protection. Through crosslinking with the polyamideimide polymer, the formation of a polymeric network within the layer and on the coated surface is promoted.

The co-binder is selected from the group consisting of epoxides, isocyanates, blocked isocyanates, and carbodiimides. Particularly preferred are N,N,N',N'-tetraglycidyl-4,4'-methylenebisbenzenamine, bisphenol-epichlorohydrin resins having an average molar mass of <700 g/mol (Cas No. 25068-38-6) and bisphenol A diglycidyl ether-bisphenol A copolymer having an average molar mass of around 900 g/mol (Cas No. 25036-25-3).

Suitable solid lubricants are the organic and also inorganic solid lubricants typically used for dry film lubricants such as waxes, modified waxes, such as, e.g., PE, PP, PA, silicone waxes, PTFE, polyfluorinated compounds, graphite, $MoS_2$, boron nitride (hexagonal), tin(IV) sulfide, zinc(II) sulfide, tungsten disulfide, metal sulfides, calcium phosphates, silicates and phyllosilicates, talc or mica. Particularly preferred is PTFE.

Additives used are adjuvants such as, for example, wetting agents, dispersing additives, defoamers, deaerating agents, flow control agents, corrosion inhibitors, and the like. In general the additives are to be adapted both to the substances used in the lubricant, such as solid lubricants and fillers, and also to the field of application, as for example to the substrate that is to be coated. It is likewise possible as and when required to use rheological additives and antisettling agents.

The wetting agents are used for the purposes, for example, of substrate wetting and pigment wetting. The wetting agents are selected from the group consisting of anionic surfactants, having carboxylate or sulfonate groups, for example, cationic surfactants, having quaternary ammonium groups, for example, nonionic surfactants, having alcohol or ether groups or combinations thereof, for example, amphoteric (zwitterionic) surfactants, having quaternary ammonium groups, for example, and carboxylates. Other wetting agents used are (modified) polysiloxanes, (block co)polymers having groups possessing pigment affinity, and the like.

Suitable fillers for the lubricants are customary fillers such as, for example, silicates and phosphates, carbon black and also various metal oxides.

The additives, fillers, and pigments which can be used are stated for example in Lackformulierung and Lackrezeptur, Bodo Müller/Ulrich Poth, Vincentz Verlag, 2nd edition, 2005, or in Lehrbuch der Lacktechnologie, Brock/Groteklaes/Mischke, Vincentz Verlag, 3rd edition, 2009.

Antiwear additives used may be various metal salt phosphates or metal salt silicates, and also mixtures thereof. Also suitable, however, are metal oxides, examples being iron oxides in various oxidation states, titanium dioxide and mixed oxides thereof, aluminum silicates, and mixed oxides. Mixtures of different antiwear additives can also be used. It is likewise possible to use various nanoparticles or nanoscale particles, which may enter into a size range of several μm, as wear protection for the dry film lubricants of the invention.

Also suitable as antiwear additives are hard ceramics such as (aluminum) corundum, boron nitride (cubic), titanium carbide, silicon carbide, silicon nitride, titanium boride ($TiB_2$), zirconium nitride (ZrN), aluminum nitride (AlN), and titanium nitride (TiN).

Possible colorants, besides certain substances stated in part under antiwear additives, suitably include all possible (color) pigments and also dyes.

The solvent is selected from the group consisting of water, organic solvents, such as aromatic solvents, e.g. xylene, ethyl and/or butyl actates; alcohols, such as ethanol, butanol; ketones, such as methyl ethyl ketone (MEK), methyl isobutyl ketone (MIBK); pyrrolidones such as 2-methylpyrrolidone (NMP), N-ethyl-2-pyrrolidone (NEP), N-butyl-2-pyrrolidone (NBP); morpholines, such as N-acetyl- or N-formylmorpholidone (NFM); amides, such as dimethylformamide (DMF), N,N-dimethylacetamide (DMAc), or propionamide (CAS 53185-52-7).

Particular preference is given to a dry film lubricant comprising:
(A) 12 to 32 wt % of PAI (solid in the dispersion used),
(B) 0.5 to 5 wt % of epoxide,
(C) 4 to 10 wt % of PTFE micropowder,
(D) 0.5 to 10 wt % of graphene,
(E) 0.1 to 2.0 wt % of wetting agent and rheological additive, and
then being made up to 100 wt % with solvent.

DETAILED DESCRIPTION

Figure 1:
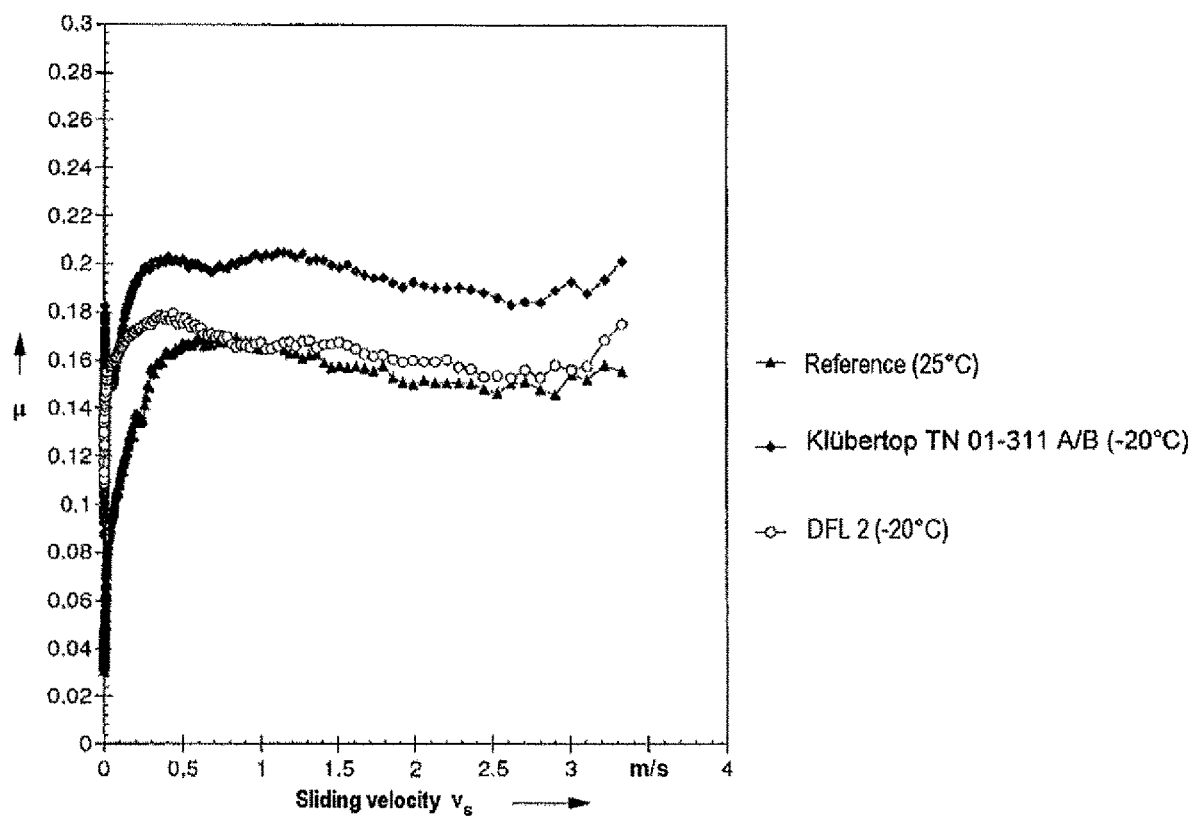
FIG. 1 shows the results of the tribological test.

The examples which follow provide a detailed description of the dry film lubricant of the invention and show the advantageous properties.

EXAMPLES

Dry Film Lubricant 1a, 1b and 1c

| PAI resin solution (NEP, 36%) | 55 wt % |
| Epoxide | 1 wt % |
| PTFE | 7 wt % |
| Graphene | 2 wt % |
| Wetting agent/rheological add. | 0.5 wt % |
| Balance solvents (xylene, NEP, NBP) | |

The lateral length of the graphene is 2 µm in Example 1a, 2 µm in Example 1b, and 7 µm in Example 1c.

Dry Film Lubricant 2a and 2b

| PAI resin solution (NEP, 36%) | 55 wt % |
| Epoxide | 1 wt % |
| PTFE | 7 wt % |
| Graphene | 5 wt % |
| Wetting agent/rheological add. | 0.5 wt % |
| Balance solvents (xylene, NEP, NBP) | |

The lateral length of the graphene is 2 µm in Example 2a, 2 µm in Example 2b.

Reference Example

| PAI resin solution (NEP, 36%) | 55 wt % |
| Epoxide | 1 wt % |
| PTFE | 7 wt % |
| Graphene | 0% |
| Wetting agent/rheological add. | 0.5 wt % |
| Balance solvents (xylene, NEP, NBP) | |

The dry film lubricants (DFLs) stated in the examples were produced using commercially available graphene platelets. These platelets are composed of individual layers of graphene, held together by weak Van der Waals forces. Graphene platelets can have a thickness of up to 100 nm, with a lateral extent of up to 20 µm. Preferred are platelets having a thickness of up to 10 nm. Particularly preferred are graphene platelets having a low thickness of a few nm—preferably 1 to 5 nm; and a lateral dimension of 0.5 to 10 µm, preferably 1 to 5 µm. The graphene platelets are used in the form of powder having a high specific surface area of at least 50 m$^2$/g, preferably at least 300 m$^2$/g, particularly preferably in the range from 500 to 800 m$^2$/g.

Various graphenes were used:
  99.5% C, 2 nm thickness, 1 to 2 µm lateral, specific surface area: 750 m$^2$/g;
  91% C, balance N and O; functionalized graphene, reduced graphene oxide; around 1 to 4 nm thickness and 1 to 2 µm lateral; specific surface area: 700 to 800 m$^2$/g;
  >96% C, 3 to 4 nm thickness, 7 µm lateral (D 90, specific surface area 300 to 400 m$^2$/g.

The dry film lubricants were subjected to standard processing and application by spraying, and cured according to standard conditions (180 to 270° C., around 1 to 2 hours). The spray application is carried out in the laboratory with a SATA Minijet, HVLP, spraying pressure 2 bar, nozzle 1.1 mm. In industrial application, electrostatically assisted spray application is also possible. As are application via high-speed rotational atomizers, and also airless spraying.

Test for Hardness:
  Nano-indentation measurement in comparison to references
  Dry film lubricant as per Example 1a and 1b: hardness similar to that of nanoreinforced lubricant;
  Dry film lubricant as per Example 2a and 2b: hardness greater than that of nanoreinforced lubricant.

To investigate the hardness of the dry film lubricants of the invention, steel samples were coated with the lubricants from the examples and cured, and were compared with a known dry film lubricant, in the present case Klübertop TN 01-311 A/B. The Klübertop dry film lubricant is reinforced with nanoparticles. Table 1 shows the results.

TABLE 1

| | Red. Modulus [GPa] | | Hardness [GPa] | |
| --- | --- | --- | --- | --- |
| | Average | St. Dev. | Average | St. Dev. |
| TN 01-311 | 5.03 | 0.44 | 0.288 | 0.040 |
| Reference | 4.65 | 0.29 | 0.262 | 0.029 |
| DFL 1a | 5.33 | 0.20 | 0.304 | 0.036 |
| DFL 1b | 5.25 | 0.27 | 0.283 | 0.026 |
| DFL 2a | 6.17 | 0.67 | 0.354 | 0.067 |
| DFL 2b | 6.01 | 0.35 | 0.326 | 0.031 |

As Table 1 shows, the dry film lubricants with 2 wt % of graphene are comparable in their hardness to the known TN 01-311; the dry film lubricants containing 5 wt % of graphene have an even greater hardness.

The dry film lubricants were next subjected to tribological tests. These tests were carried out using a rotational tribometer at a uniform, continuously increasing velocity; ball made of 100Cr6 coated against uncoated steel surface (material also 100Cr6), velocity increasing from 0 m/s to 3.3 m/s, movement linear, surface pressure 378 MPa.

The dry film lubricants from Examples 1 and 2 were compared with the above-specified reference dry film lubricant and with a finished product Klübertop TN 01-311 A/B, a nanoreinforced dry film lubricant.

Testing took place at −20° C., at room temperature (RT) and 150° C., with increasing sliding velocity. Here it was found surprisingly (FIG. 1) that in particular the dry film lubricant from Example 2 (5 wt % of graphene) has a significant improvement in the coefficient of friction at high velocity (>0.5 m/s) at −20° C. in comparison to the reference samples, with Klübertop TN 01-311 being depicted at 20° C. and the reference example at RT.

It was found that the coefficient of friction at the temperature and the velocities is comparable to the coefficient of friction of the references at room temperature.

Tests were subsequently carried out in relation to the wear resistance, by coating ball on plate with the above-stated dry film lubricants; ball diameter 5 mm, load: 9.81 N, oscillating movement, stroke 1 cm, 2400 mm/min velocity.

A metallic surface was coated as described above.

Figure 2:
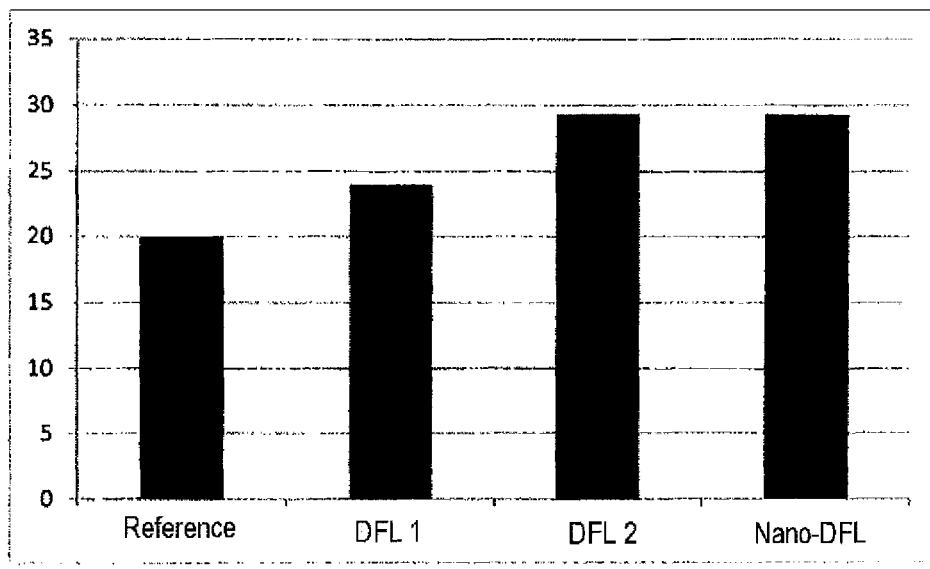
FIG. 2 shows the results of the wear resistance investigations with layer thickness 1.

FIG. 2 shows that dry film lubricant 1 (2 wt % of graphene) has an around 20% increased wear resistance in the ball/plate test in comparison to the reference example.

Dry film lubricant 2 (5 wt % of graphene) has a wear resistance increased by around 40 to 50% and is at a level with nanoreinforced dry film lubricant Klübertop TN 01-311 A/B.

Figure 3:
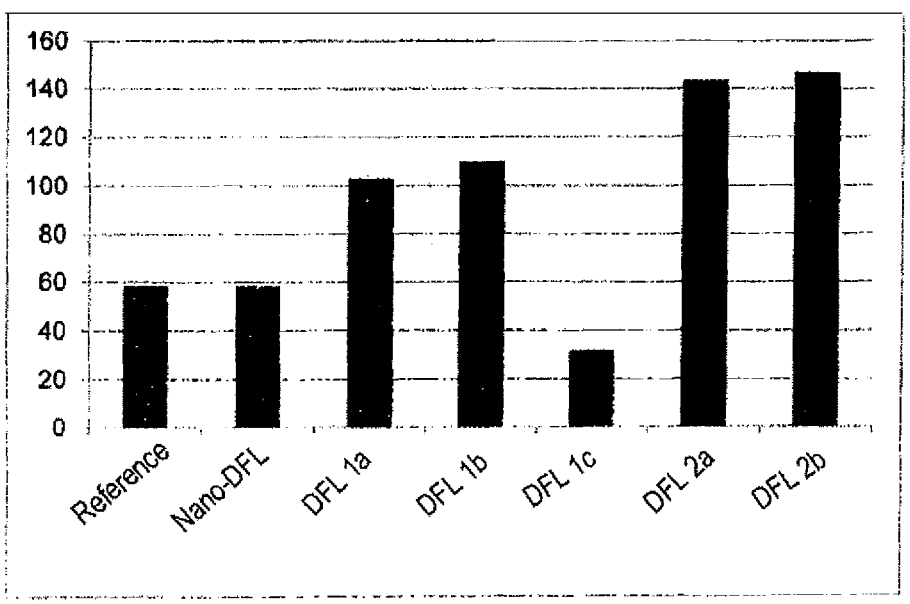
FIG. 3 shows the results of the wear resistance investigations with layer thickness 2.

FIG. 3 shows that the nanoreinforced dry film lubricant and the reference example are at the same level at this layer thickness. Dry film lubricant 1 (duplicate determination) exhibits a wear resistance increased by around 70% relative to the reference example; dry film lubricant 2 (duplicate determination) exhibits a wear resistance increased by around 140%.

Table 2 shows the data of FIGS. 2 and 3; the layer thickness 2 is significantly greater than layer thickness 1. It was possible to show that a graphene with a size of 7 nm yielded poorer results.

TABLE 2

|  | Layer thickness 1 Cycles/Layer thickness [1/μm] | Layer thickness 2 Cycles/Layer thickness [1/μm] |
| --- | --- | --- |
| TN 01-311 | 29 | 57 |
| Reference | 20 | 58 |
| DFL 1a | 23 | 103 |
| DFL 1b | 24 | 110 |
| DFL 1c | 18 | 32 |
| DFL 2a | 29 | 143 |
| DFL 2b | 28 | 147 |

The dry film lubricants of the invention are suitable for use on metallic surfaces, such as, for example, pistons (engine pistons, compressor pistons), parts in air-conditioning compressors, including swash plate, magnetic anchor coatings, compressor screws, coupling sleeves, bearing cage for ball/roller bearings and the like, belt guides, ball studs, chassis components, sliding bearings (connecting-rod bearings), anti-friction bushes, steering rack/steering sleeves, belt buckle parts such as detent cams and the like, axles for planetary gears, threaded spindles, screws and screw connections, rotors, springs, valves, household and garden appliances, non-stick coatings.

Furthermore, the lubricant of the invention can also be used for screenprinting/knife coating processes. The lubricant of the invention can be applied in the form of spray, dipping baths, dip-spinners, tumbling to the workpiece that is to be coated.

It has therefore emerged that the use of graphene in a dry film lubricant is not on its own sufficient to improve the properties of the dry film lubricant. What is required instead is a combination of graphene with a solid lubricant, especially PFTE, and a co-binder in the dry film lubricant in order to the properties of the lubricant in relation to wear resistance and resistance toward friction.

The invention claimed is:
1. A graphene-containing dry film lubricant comprising:
(A) 12 to 32 wt % of binder;
(B) 0.5 to 5 wt % of co-binder, wherein co-binder is selected from the group consisting of (a) a molecular compound or an oligomer compound having a molar mass (Mw) of <1 000 g/mol and that is selected from the group consisting of epoxides, isocyanates, blocked isocyanates and carbodiimides, (b) N,N,N',N'-tetraglycidyl-4,4'-methylenebisbenzenamine, bisphenol-epichlorohydrin resins having an average molar mass of <700 g/mol, and (c) bisphenol A diglycidyl ether-bisphenol A copolymer having an average molar mass of 900 g/mol;
(C) 4 to 10 wt % of solid lubricant;
(D) 0.5 to 10 wt % of graphene;
(E) 0.1 to 2.0 wt % of additives; and
(F) solvent to make up to 100 wt %.
2. The graphene-containing dry film lubricant as claimed in claim 1, wherein the binder is a polymer having a molar mass (Mw) of at least 5 000 g/mol to 100 000 g/mol and is selected from the group consisting of polyamideimide (PAI), polyimide (PI), polyetheretherketone (PEEK), polyetherketone (PEK), polyethersulfone (PES), and silicone resins or mixtures thereof.
3. The graphene-containing dry film lubricant as claimed in claim 1, wherein polyamideimide (PAI) having a molar mass (Mw) of 10 000 to 30 000 g/mol is used as binder.
4. The graphene-containing dry film lubricant as claimed in claim 1, wherein the solid lubricant is selected from the group consisting of waxes, modified waxes, PE, PP, PA, silicone waxes, PTFE, polyfluorinated compounds, $MoS_2$, boron nitride (hexagonal), tin(IV) sulfide, zinc(II) sulfide, tungsten disulfide, metal sulfides, calcium phosphates, silicates, phyllosilicates, talc and mica.
5. The graphene-containing dry film lubricant as claimed in claim 1, wherein the solid lubricant is PTFE.
6. The graphene-containing dry film lubricant as claimed in claim 1, wherein graphene is used in the form of graphene platelets which have a thickness of up to 100 nm with a lateral extent of up to 20 μm.
7. The graphene-containing dry film lubricant as claimed in claim 6, wherein the graphenes are selected from the group consisting of: (a) graphenes comprising 99.5% C, having 1 to 4 nm thickness, 1 to 5 μm lateral length, and a specific surface area of 750 $m^2$/g, and (b) graphenes comprising one of 91% C, balance N and O, functionalized graphene, and reduced graphene oxide; the graphenes having 1 to 4 nm thickness, 1 to 5 μm lateral length and a specific surface area of 700 to 800 $m^2$/g.
8. The graphene-containing dry film lubricant as claimed in claim 1, wherein the additives are selected from the group consisting of wetting agents, dispersing additives, defoamers, deaerating agents, flow control agents, rheological additives, antisettling agents, antiwear agents, pigments, and dyes.
9. A graphene-containing dry film lubricant coating comprising after curing:
(A) 70.2 to 54.2 wt % of binder;
(B) 2.9 to 8.5 wt % of co-binder, wherein co-binder is selected from the group consisting of (a) a molecular compound or an oligomer compound having a molar mass (Mw) of <1 000 g/mol and that is selected from the group consisting of epoxides, isocyanates, blocked isocyanates and carbodiimides, (b) N,N,N',N'-tetraglycidyl-4,4'-methylenebisbenzenamine, bisphenol-epichlorohydrin resins having an average molar mass of <700 g/mol, and (c) bisphenol A diglycidyl ether-bisphenol A copolymer having an average molar mass of 900 g/mol;
(C) 23.4 to 16.9 wt % of solid lubricant;
(D) 2.9 to 16.9 wt % of graphene;
(E) 0.6 to 3.4 wt % of additives.
10. A method for using the graphene-containing dry film lubricant as claimed in claim 1, comprising applying the dry film lubricant as a coating on metallic materials, composite materials, aluminum, aluminum alloys, steel materials, stainless-steel materials, casting materials, nonferrous metals, plastics, and polymers.
11. The graphene-containing dry film lubricant as claimed in claim 6, wherein graphene is used in the form of graphene platelets which have a thickness of 1 to 5 nm and a lateral extent of 0.5 to 10 μm.
12. A graphene-containing dry film lubricant comprising:
(A) 12 to 32 wt % of binder;
(B) 0.5 to 5 wt % of co-binder selected from the group consisting of (a) N,N,N',N'-tetraglycidyl-4,4'-methylenebisbenzenamine, bisphenol-epichlorohydrin resins having an average molar mass of <700 g/mol, and (b)

bisphenol A diglycidyl ether-bisphenol A copolymer having an average molar mass of 900 g/mol;
(C) 4 to 10 wt % of solid lubricant;
(D) 0.5 to 10 wt % of graphene;
(E) 0.1 to 2.0 wt % of additives, and
(F) solvent to make up to 100 wt %.

13. The graphene-containing dry film lubricant as claimed in claim 12, wherein the binder is a polymer having a molar mass (Mw) of at least 5 000 g/mol to 100 000 g/mol and is selected from the group consisting of polyamideimide (PAI), polyimide (PI), polyetheretherketone (PEEK), polyetherketone (PEK), polyethersulfone (PES), and silicone resins or mixtures thereof.

14. The graphene-containing dry film lubricant as claimed in claim 12, wherein polyamideimide (PAI) having a molar mass (Mw) of 10 000 to 30 000 g/mol is used as binder.

15. The graphene-containing dry film lubricant as claimed in claim 12, wherein the solid lubricant is selected from the group consisting of waxes, modified waxes, PE, PP, PA, silicone waxes, PTFE, polyfluorinated compounds, $MoS_2$, boron nitride (hexagonal), tin(IV) sulfide, zinc(II) sulfide, tungsten disulfide, metal sulfides, calcium phosphates, silicates, phyllosilicates, talc and mica.

16. The graphene-containing dry film lubricant as claimed in claim 12, wherein graphene is used in the form of graphene platelets which have a thickness of up to 100 nm with a lateral extent of up to 20 μm.

17. The graphene-containing dry film lubricant as claimed in claim 16, wherein the graphenes are selected from the group consisting of: (a) graphenes comprising 99.5% C, having 1 to 4 nm thickness, 1 to 5 μm lateral length, and a specific surface area of 750 $m^2/g$, and (b) graphenes comprising one of 91% C, balance N and O, functionalized graphene, and reduced graphene oxide; the graphenes having 1 to 4 nm thickness, 1 to 5 μm lateral length and a specific surface area of 700 to 800 $m^2/g$.

18. The graphene-containing dry film lubricant as claimed in claim 12, wherein the additives are selected from the group consisting of wetting agents, dispersing additives, defoamers, deaerating agents, flow control agents, rheological additives, antisettling agents, antiwear agents, pigments, and dyes.

* * * * *